United States Patent
Nagasaku

(10) Patent No.: US 9,827,851 B2
(45) Date of Patent: Nov. 28, 2017

(54) FUEL TANK WITH AN INTERNAL SUPPORT STRUCTURE

(71) Applicant: TOYOTA JIDOSHA KABUSHIKI KAISHA, Toyota-shi (JP)

(72) Inventor: Yuichi Nagasaku, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/898,398

(22) PCT Filed: Jun. 12, 2014

(86) PCT No.: PCT/IB2014/001049
§ 371 (c)(1),
(2) Date: Dec. 14, 2015

(87) PCT Pub. No.: WO2014/199222
PCT Pub. Date: Dec. 18, 2014

(65) Prior Publication Data
US 2016/0114675 A1    Apr. 28, 2016

(30) Foreign Application Priority Data

Jun. 14, 2013 (JP) .................. 2013-126093

(51) Int. Cl.
*B60K 15/077* (2006.01)
*B60K 15/03* (2006.01)

(52) U.S. Cl.
CPC ...... *B60K 15/077* (2013.01); *B60K 15/03177* (2013.01); *B60K 2015/0344* (2013.01); *B60K 2015/03493* (2013.01); *B60K 2015/0775* (2013.01)

(58) Field of Classification Search
CPC ............ B60K 15/077; B60K 15/03177; B60K 2015/0775; B60K 2015/0344; B60K 2015/03493
See application file for complete search history.

(56) References Cited

U.S. PATENT DOCUMENTS

| 6,138,859 A | 10/2000 | Aulph et al. |
| 2006/0207991 A1 | 9/2006 | Sugiura |
| 2010/0237080 A1* | 9/2010 | Gebert ............. B60K 15/03177 220/562 |
| 2012/0024868 A1 | 2/2012 | Menke |

FOREIGN PATENT DOCUMENTS

| JP | 61-285122 A | 12/1986 |
| JP | 2004-090698 | 3/2004 |
| JP | 2011-093408 A | 5/2011 |
| JP | 2012-035914 | 2/2012 |

OTHER PUBLICATIONS

International Search Report dated Oct. 8, 2014 in PCT/IB2014/001049.

* cited by examiner

*Primary Examiner* — Stephen Castellano
(74) *Attorney, Agent, or Firm* — Oblon, McClelland, Maier & Neustadt, L.L.P.

(57) ABSTRACT

A fuel tank includes a plurality of extending members that extend from an inside surface of a fuel tank main body, a connecting member that is arranged between the plurality of extending members and connects each of these extending members together, and a flexible portion formed on the connecting member.

7 Claims, 9 Drawing Sheets

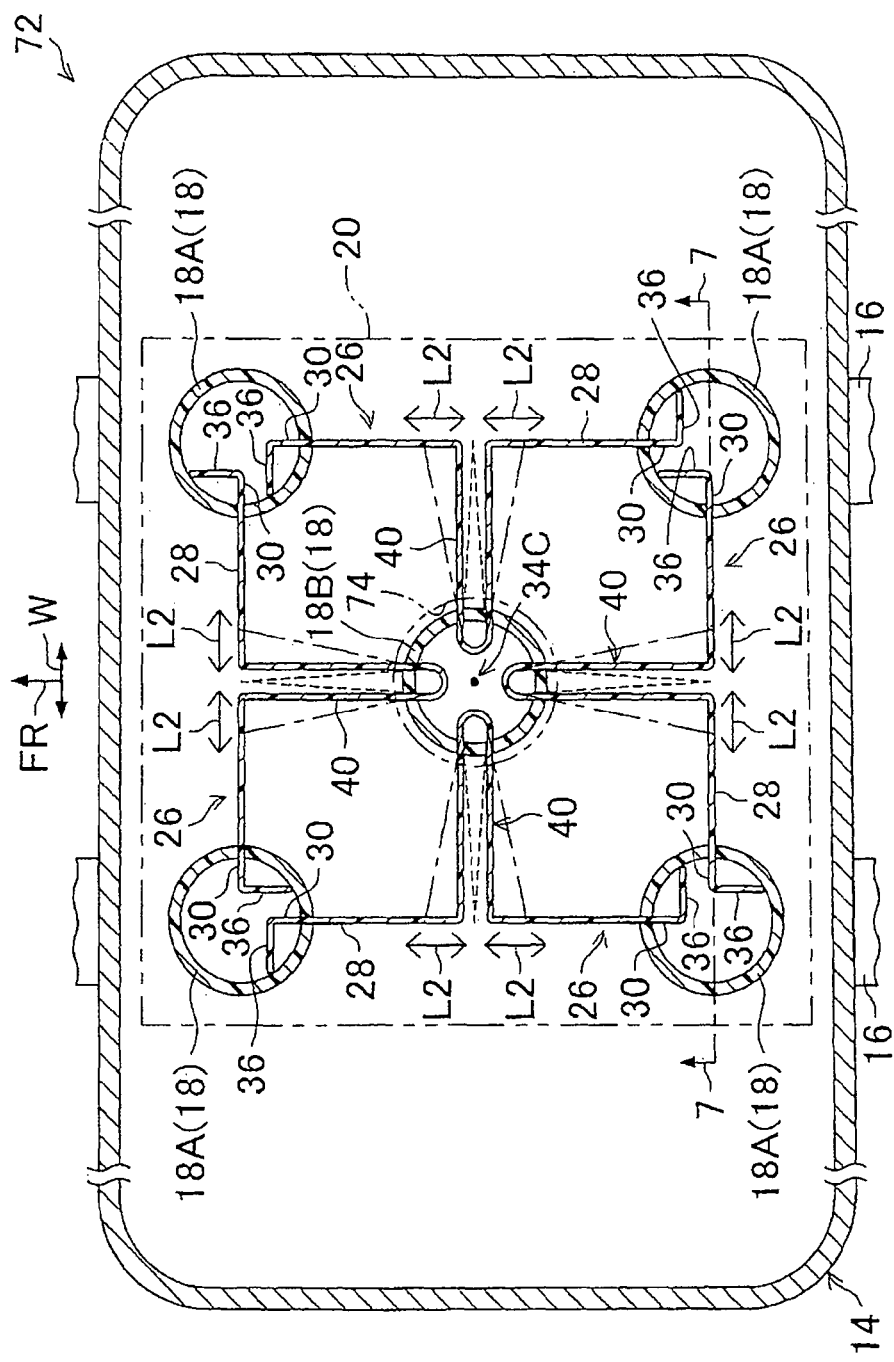

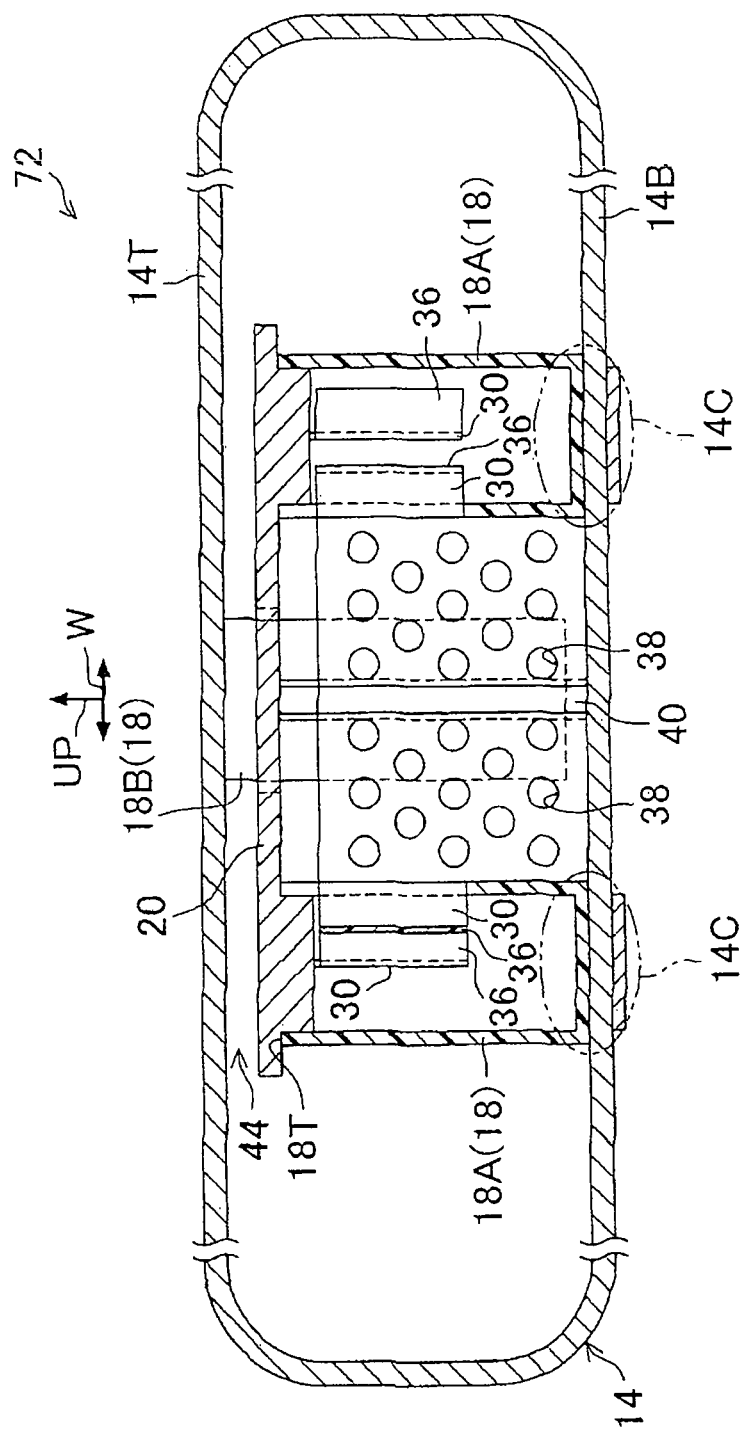

FUEL TANK WITH AN INTERNAL SUPPORT STRUCTURE

This application is a national stage (Rule 371) of international application No. PCT/IB2014/001049 filed Jun. 12, 2014.

BACKGROUND OF THE INVENTION

1. Field of the Invention

The invention relates to a fuel tank.

2. Description of Related Art

Japanese Patent Application Publication No. 2012-35914 (JP 2012-35914 A), for example, describes one known structure of a fuel tank mounted in a vehicle, in which both compression force and tensile force are able to be absorbed by providing a reinforcing device between an upper surface and a lower surface of the tank.

In a structure in which a plurality of members are attached to one surface of a fuel tank main body, for example, if these members are joined in a manner in which they are unable to move relative to one another, stress may concentrate at attaching portions where these members are attached to the fuel tank main body, when the fuel tank main body deforms.

SUMMARY OF THE INVENTION

The invention thus provides a fuel tank that mitigates the concentration of stress at attaching portions of a plurality of members that are attached to an inside surface of a fuel tank main body, when the fuel tank main body deforms.

One aspect of the invention relates to a fuel tank that includes a fuel tank main body within which fuel is stored; a plurality of extending members that extend toward an inside of the fuel tank main body from an inside surface of the fuel tank main body; a connecting member that connects each of the plurality of extending members together; and a flexible portion that is formed on the connecting member and allows the connecting member to flex.

With this fuel tank, the plurality of extending members extend toward the inside of the fuel tank from the inside surface of the fuel tank main body.

The connecting member connects the plurality of extending members together. This connecting member imparts resistance on the flow of fuel inside the fuel tank main body.

The flexible portion is formed on the connecting member. This flexible portion allows the connecting member to flex. For example, when extending members that are connected by the connecting member move relatively toward or away from each other, the flexible portion follows this movement and allows the connecting member to flex. That is, when the fuel tank main body deforms, even if the plurality of extending members move toward or away from each other, this movement is absorbed by the flexing of the connecting member, so the concentration of stress at the attaching portions of the extending members that are attached to one surface of the fuel tank main body portion is able to be mitigated.

Not all of the plurality of extending members have to be attached to the same surface. In other words, the "inside surface" to which the plurality of extending members are attached does not have to be a single surface. The structure may also be one with an extending member that is attached to a lower surface of the fuel tank main body, and an extending member that is attached to an upper surface of the fuel tank main body.

In the fuel tank, three or more of the extending members may be provided so as to be not collinear when viewed from a normal direction of the inside surface, and the extending members are integrated by being connected by the connecting member.

Three or more of the extending members are provided so as to be not collinear when viewed from the normal direction of the inside surface, and these extending members are integrated by being connected (modularized) by the connecting member. Therefore, the extending members have greater shape stability as an integrated member compared to a structure in which they are collinear (i.e., on the same line). Having the plurality of extending members be integrated with the connecting member makes it easier to attach them to the fuel tank main body compared to when they are separate structures.

In the fuel tank, the flexible portion may be a flexible protruding portion that protrudes in a direction intersecting a direction toward and away from the extending members when viewed from the normal direction of the inside surface.

A structure in which the connecting member is able to flex is able to be achieved by a simple structure that forms a flexible protruding portion.

In the fuel tank, the flexible portion may be a flexible protruding portion that protrudes in a direction intersecting a direction toward and away from the plurality of extending portions that are adjacent to each other when viewed from the normal direction of the inside surface.

A structure in which the connecting member is able to flex is able to be achieved by a simple structure that forms a flexible protruding portion.

In the fuel tank, the flexible protruding portion may protrude toward a center of a polygonal shape of which the three or more of the extending members are vertices when viewed from the normal direction of the inside surface.

In a structure in which the flexible protruding portion protrudes toward the inside of a polygonal shape, and the extending members are integrated with the connecting member, the flexible protruding portion does not stick out to the outside, so handling is excellent. Also, fuel will not inadvertently strike the flexible protruding portion that is sticking out inside the fuel tank main body, so a striking sound is able to be suppressed.

The fuel tank may also include a joining member that joins together a plurality of the flexible protruding portions that protrude toward the center.

Joining the plurality of flexible protruding portions together by the joining member enables to the rigidity of the flexible protruding portions to be improved. Also, the shape of the integrated structure in which the extending members are integrated with the connecting member is able to be stably maintained.

In the fuel tank, the extending members may be attached to the inside surface so as to extend toward an opposing surface that opposes the inside surface of the fuel tank main body.

The plurality of extending members extend toward the opposing surface, so when the inside surface and the opposing surface come relatively close, to each other due to deformation of the fuel tank main body, the tip ends of the extending members contact the opposing surface, thereby inhibiting deformation of the fuel tank main body.

In the fuel tank, the extending members may be deformation inhibiting members that oppose the opposing surface in a non-contact state when a tank internal pressure of the fuel tank main body is at atmospheric pressure, and inhibit deformation of the fuel tank main body resulting from the inside surface coming close to the opposing surface.

When the tank internal pressure is at atmospheric pressure, the extending members do not contact the opposing surface, so even if the inside surface and the opposing surface come close together, deformation of the fuel tank main body is able to be allowed only until the extending members contact the opposing surface. Also, having the extending members contact the opposing surface inhibits deformation of the fuel tank main body, and enables the rigidity of the fuel tank main body to be ensured.

In the fuel tank, the connecting member may be a flow resistance plate that imparts resistance on a flow of fuel inside the fuel tank main body.

Resistance to the flow of fuel inside the fuel tank main body is able to be created by the flow resistance plate. The connecting member also serves as the flow resistance plate, so the number of parts is able to be fewer compared to a structure in which the connecting member and the flow resistance plate are provided separately.

The invention has the foregoing structure, so is able to mitigate the concentration of stress at the attaching portions of a plurality of members that are attached to the inside surface of the fuel tank main body when the fuel tank main body deforms.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a horizontal sectional view of a fuel tank according to a third example embodiment of the invention;

FIG. 7 is a sectional view taken along line 7-7 in FIG. 6, of the fuel tank according to the third example embodiment of the invention;

DETAILED DESCRIPTION OF EMBODIMENTS

A fuel-tank according to a first example embodiment of the invention will now be described with reference to the accompanying drawings.

Figure 1:
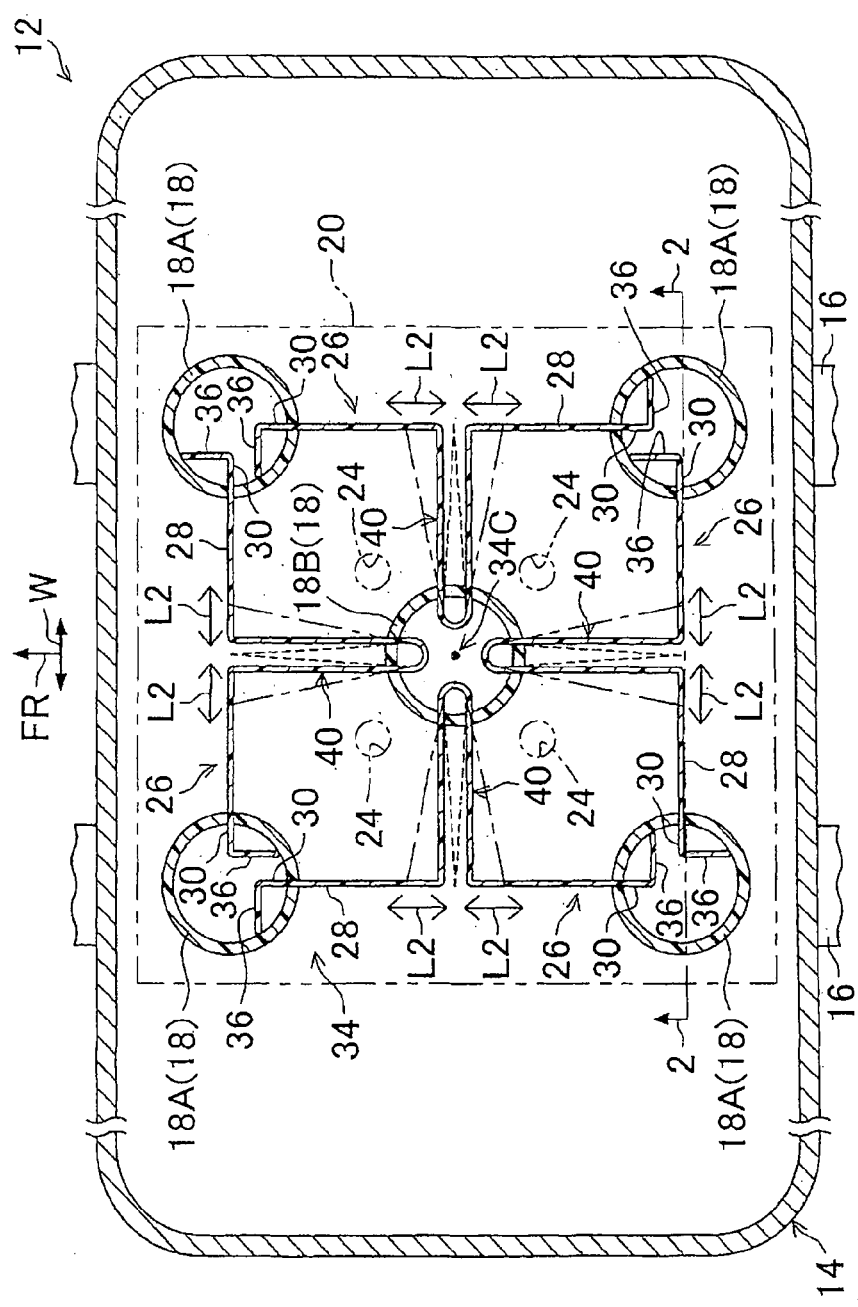
FIG. 1 is a horizontal sectional view of a fuel tank according to a first example embodiment of the invention.

FIG. 1 is a view of a fuel tank 12 according to the first example embodiment of the invention. In the description below, arrow FR in the drawings indicates a forward direction with respect to a vehicle, arrow UP in the drawings indicates an upward direction with respect to the vehicle, and arrow W in the drawings indicates a vehicle width direction.

Figure 2:
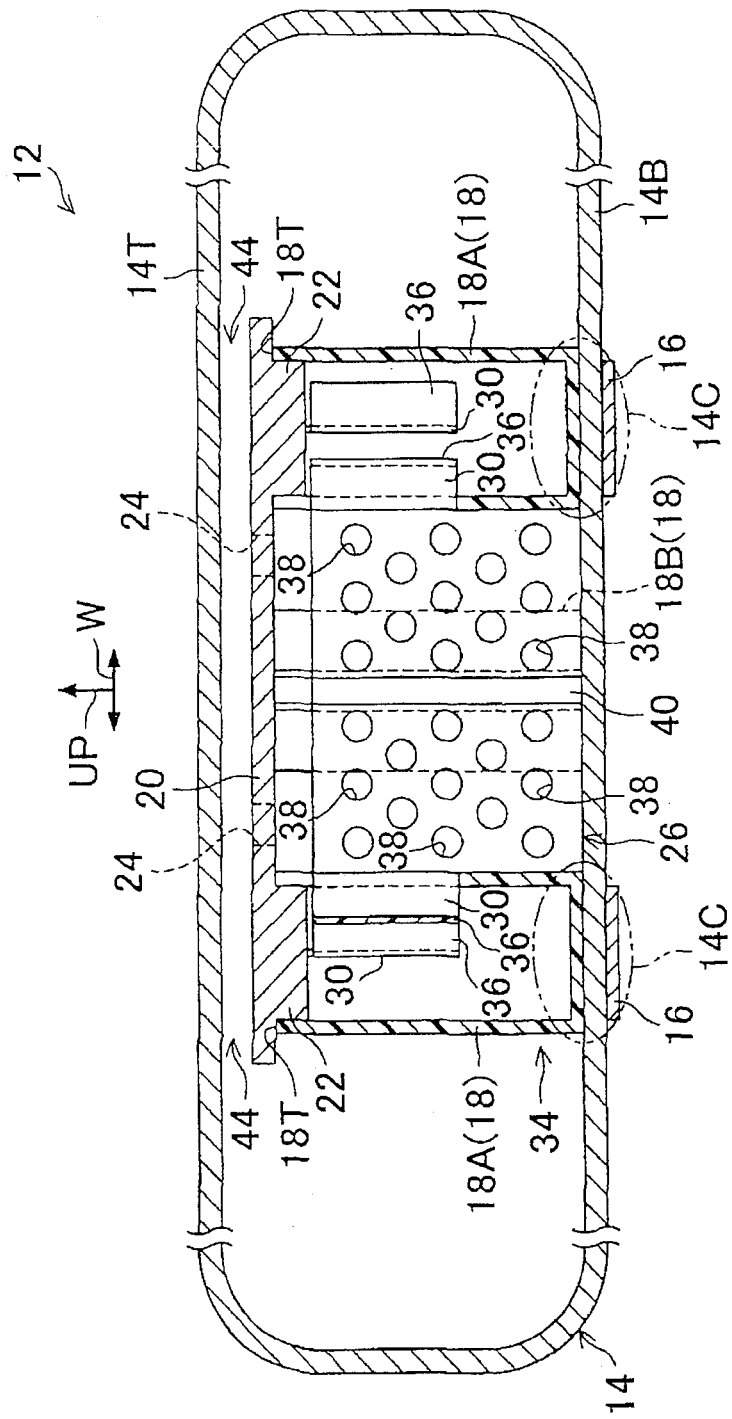
FIG. 2 is a sectional view taken along line 2-2 in FIG. 1, of the fuel tank according to the first example embodiment of the invention.

The fuel tank 12 has a fuel tank main body 14 capable of storing fuel therein. In this example embodiment, the fuel tank main body 14 is made of resin. The fuel tank main body 14 is formed in an overall shape that is able to store fuel therein (for example, in the example shown in the drawings, the fuel tank main body 14 has a generally rectangular parallelepiped box shape). In particular, in this example embodiment, the fuel tank main body 14 has a lower surface 14B, and an upper surface 14T that is parallel to this lower surface 14B, as shown in FIG. 2.

The fuel tank main body 14 is supported from below by one or a plurality (two in the example shown) of tank bands 16. Both ends of each tank band 16 are fixed to a bracket of a floor panel of a vehicle body. Thus, the fuel tank main body 14 is attached to the floor panel in a state supported by the tank bands 16.

In the fuel tank main body 14, a plurality of deformation inhibiting members 18 are attached to the lower surface 14B. In this example embodiment, the structure is such that four deformation inhibiting members (hereinafter referred to as "deformation inhibiting members 18A" as appropriate) that are positioned at the vertices of a square, and one deformation inhibiting member (hereinafter referred to as "deformation inhibiting member 18B" as appropriate) that is positioned at the center of this square, when viewed in the normal direction of the lower surface 14B (i.e., when the fuel tank main body 14 is viewed from above), as is evident from FIG. 1, are attached to the lower surface 14B.

In this example embodiment, each deformation inhibiting member 18 is formed in a cylindrical shape. When the tank internal pressure of the fuel tank main body 14 is at atmospheric pressure, an upper end 18T of the deformation inhibiting member 18 does not contact the upper surface 14T of the fuel tank main body 14, so a gap 44 is formed via a vertical separator 20 that will be described later. A fuel inflow-outflow hole, not shown, is formed in a lower portion of the deformation inhibiting member 18, and fuel flows into and out of the deformation inhibiting member 18.

The vertical separator 20 is arranged between the five deformation inhibiting members 18 and the upper surface 14T of the fuel tank main body 14. In this example embodiment, the vertical separator 20 is formed in a square plate shape that is larger than the square of which the deformation inhibiting member 18 are the vertices, when the lower surface 14B is viewed from the normal direction.

As shown in FIG. 2, protruding portions 22 are formed extending downward in positions corresponding to each of the five deformation inhibiting members 18. The vertical separator 20 is attached to the deformation inhibiting members 18 with each of these protruding portions 22 housed inside the corresponding deformation inhibiting member 18.

One or a plurality of through-holes 24 that extend (i.e., pass through) in the thickness direction (i.e., the vertical direction) are formed through the vertical separator 20. The vertical separator 20 imparts flow resistance in the vertical direction on fuel that flows inside the fuel tank main body 14, and thus suppresses flow noise, but enables fuel above the vertical separator 20 to flow down through the through-holes 24.

Four lateral separators 26 are arranged between the four deformation inhibiting members 18A. As is evident from FIG. 1, the lateral separators 26 are positioned so that each one forms a side of the square of which the four deformation inhibiting members 18 are the vertices. The lateral separators 26 are one example of a flow resistance plate of the invention.

Figure 3:
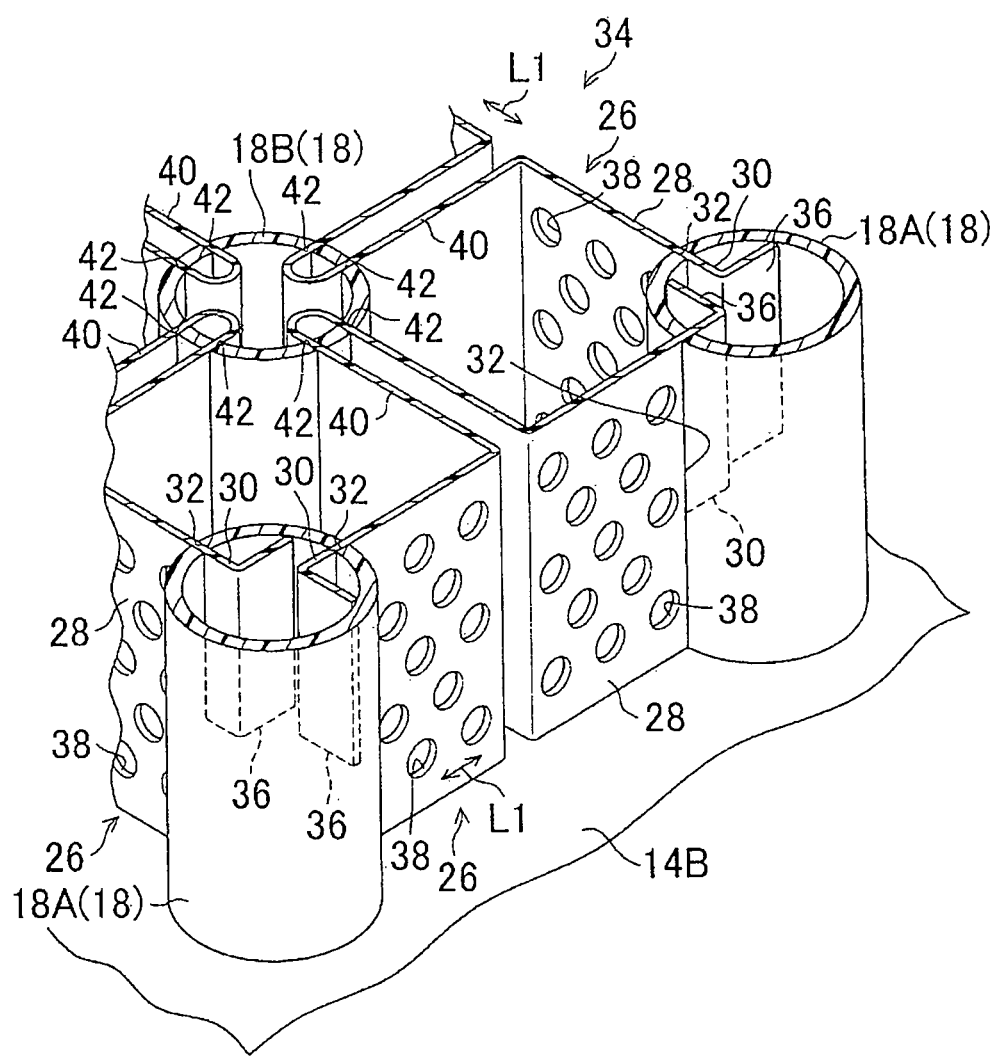
FIG. 3 is a partially fractured perspective view of part of the internal structure of the fuel tank according to the first example embodiment of the invention.

Each of the lateral separators 26 has a plate-shaped separator main body portion 28 having a height substantially the same as that of the deformation inhibiting member 18, as shown in more detail in FIG. 3 as well. An insert piece 30 is formed on an upper portion of both ends of the separator main body portion 28 in the length direction thereof (i.e., the direction of arrow L1). The insert piece 30 is inserted from above into an insert groove 32 formed in the deformation inhibiting member 18A. As a result, an integrated member 34 that is integrated in a square frame shape when viewed from above, is formed by the four deformation inhibiting members' 18A and the four lateral separators 26.

A tip end of the insert piece 30 is a bent portion 36 that is bent at a substantially right angle. A tip end of the bent portion 36 contacts the inside surface of the deformation inhibiting member 18A. If the insert piece 30 moves in a direction in which it will come out of the insert groove 32, the bent portion 36 will catch on the inside surface of the deformation inhibiting member 18A, or deformation of the bent portion 36 will become resistance and inhibit the insert piece 30 from coming out.

Through-holes 38 that extend in the thickness direction (i.e., the vehicle width direction or the vehicle longitudinal direction, depending on the position of the lateral separators 26) are formed through the lateral separators 26. The lateral separators 26 impart flow resistance in the lateral direction (i.e., the vehicle width direction or the vehicle longitudinal direction) on fuel that flows inside the fuel-tank main body 14, and thus suppresses flow noise, but allows fuel to move laterally by passing through the through-holes 38.

A flexible protruding portion 40 is formed in the center position, in the length direction, of the separator main body portion 28 of each of the lateral separators 26. As shown in FIG. 1, the flexible protruding portion 40 is formed by the separator main body portion 28 partially protruding toward the center 34C of the square of the integrated member 34 when viewed in the normal direction of the lower surface 14B. In other words, the flexible protruding portion 40 is formed protruding in a direction that intersects a direction toward and away from a plurality of the deformation inhibiting members 18A that are adjacent to each other when viewed in the normal direction of the lower surface 14B.

An upper portion of a tip end portion of the flexible protruding portion 40 is inserted into an insert groove 42 formed in the deformation inhibiting member 18B. That is, four flexible protruding portions 40 are joined together by the deformation inhibiting member 18B, near the center 34C of the integrated, member 34. As a result, the rigidity in the vertical direction of the lateral separators 26 increases, so the shape stability of the integrated member 34 is also improved. The deformation inhibiting member 18B is one example of a joining member of the invention.

A portion of the flexible protruding portion 40 positioned to the outside of the deformation inhibiting member 18B expands and contracts as shown by the alternate long and short dashed line or the broken line in FIG. 1. As a result, both side portions of the flexible protruding portion 40 of the separator main body portion 28 move toward and away from each other, allowing the lateral separator 26 to expand and contract.

Assuming a state in which the integrated member 34 of this example embodiment is rotated by a natural number of 90 degrees with the center 34C of the integrated member 34 as the axis, the structure will overlap before and after rotation. Therefore, direction dependence when the integrated member 34 is assembled to the fuel tank main body 14 is reduced (i.e., the integrated member 34 can be assembled to the fuel tank main body 14 regardless of the four directions in which it is rotated 90 degrees), so assembly work is easy.

Next, the operation of the fuel tank 12 according to the first example embodiment will be described.

The deformation inhibiting members 18, the vertical separator 20, and the lateral separators 26 are all provided inside the fuel tank 12. When the upper surface 14T and the lower surface 14B of the fuel tank main body 14 come close to one another, the upper end of the deformation inhibiting members 18 will contact the upper surface 14T (i.e., contact the upper surface 14T via the vertical separator 20 in this example embodiment), so excessive deformation of the fuel tank main body 14 is able to be inhibited.

Also, the vertical separator 20 and the lateral separators 26 impart flow resistance on the flow of fuel inside the fuel tank main body 14, and are thus able to suppress flow noise.

The deformation inhibiting members 18, the vertical separator 20, and the lateral separators 26 are integrated to form the integrated member 34. As a result, handling and assembly to the fuel tank main body 14 are easier than they are with a structure in which the deformation inhibiting members 18, the vertical separator 20, and the lateral separators 26 are separate.

In particular, in this example embodiment, the plurality of (four) flexible protruding portions 40 are connected at the center 34C of the integrated member 34, so the shape of the integrated member 34 is able to be stably maintained. Moreover, the rigidity of the flexible protruding portions 40 is improved, so the lower surface 14B and the upper surface 14T of the fuel tank main body 14 are also able to be inhibited from coming close to each other by these flexible protruding portions 40.

With the fuel tank main body 14, the dimensions between the attaching portions 14C of the deformation inhibiting members 18 that attach to the lower surface 14B of the fuel tank main body 14 may change due to a change in temperature during molding, or due to a change in the tank internal pressure while the vehicle is traveling, for example.

With the fuel tank 12 of this example embodiment, the flexible protruding portions 40 are formed on the lateral separators 26, so even if there is a change in the dimensions as described above, the lateral separators 26 are able to flex by the flexible protruding portions 40 expanding and contracting (see arrows L2) as shown by the alternate long and short dashed lines or the broken lines in FIG. 1. Also, a change in distance between the deformation inhibiting members 18 is absorbed by the flexing of the lateral separators 26. Therefore, compared with a structure in which the lateral separators 26 are not flexible, the concentration of stress at the attaching portions 14C that attach to the lower surface 14B of the fuel tank main body 14 is able to be mitigated even if the dimensions change as described above.

Next, a fuel tank according to a second example embodiment of the invention will be described with reference to the drawings. In the second example embodiment, elements and members and the like similar to those in the first example embodiment will be denoted by like reference characters, and detailed descriptions thereof will be omitted.

With a fuel tank 52 of the second example embodiment, cylindrical deformation inhibiting members 18A and 18B are attached to the same positions as they are in the fuel tank 12 of the first example embodiment.

Figure 4:
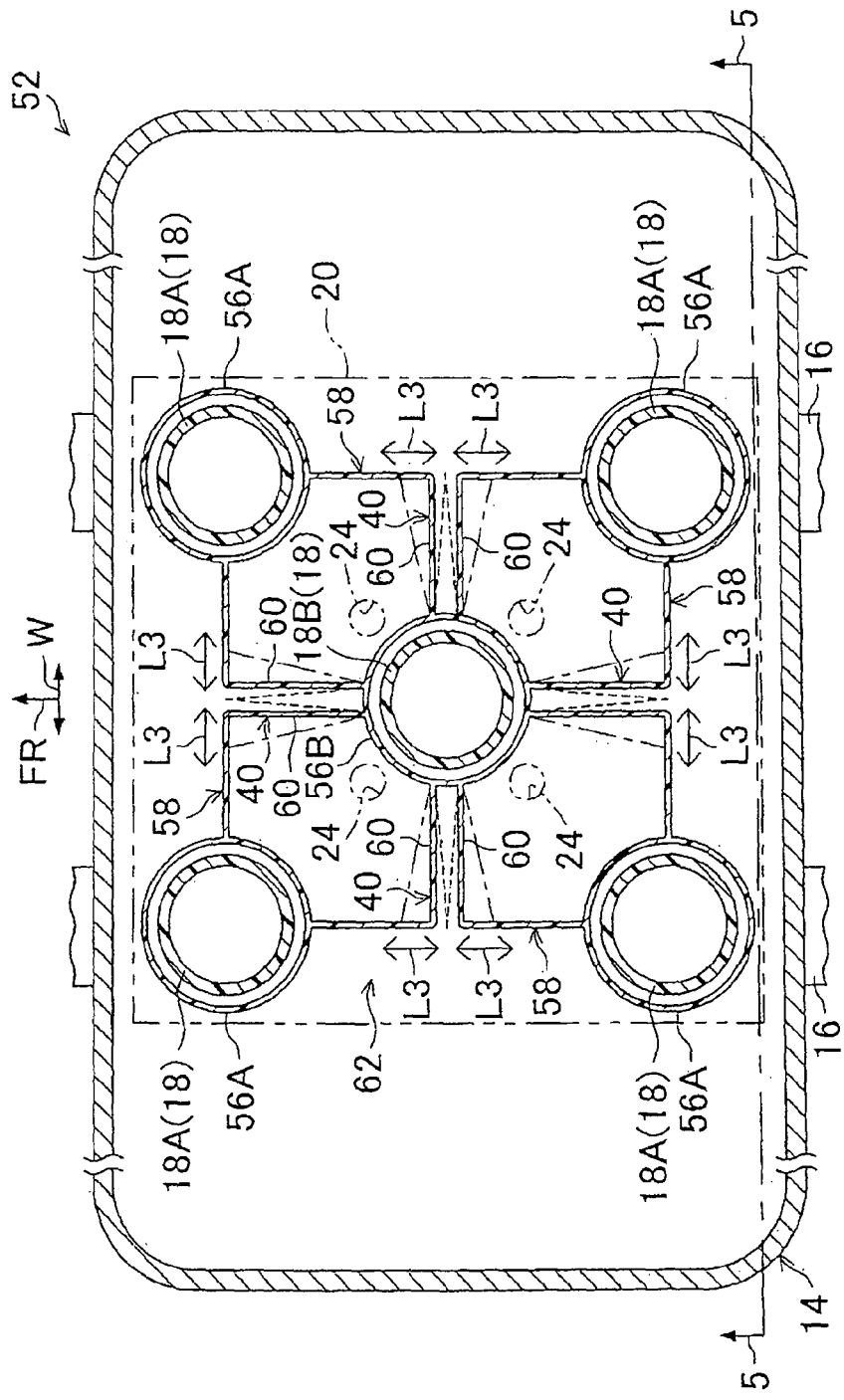
FIG. 4 is a horizontal sectional view of a fuel tank according to a second example embodiment of the invention.
Figure 5:
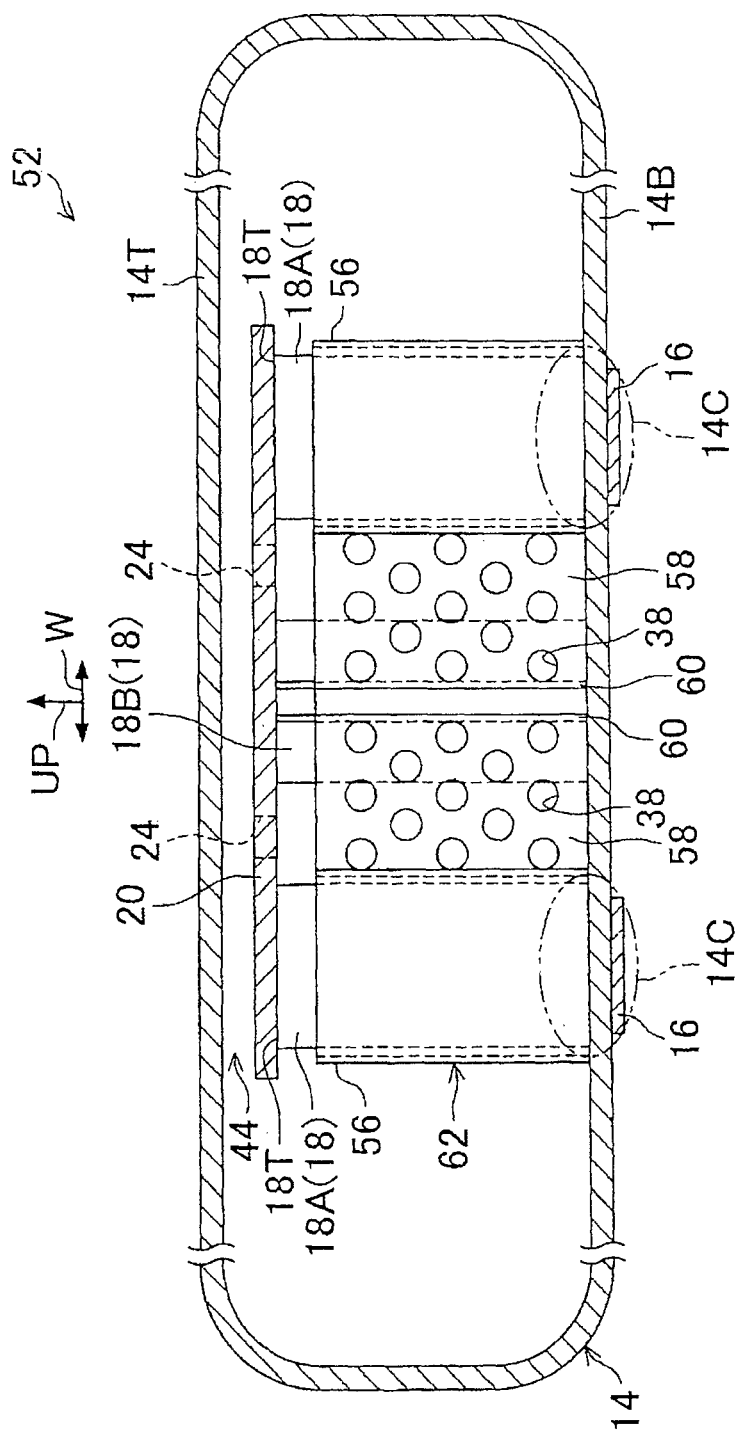
FIG. 5 is a sectional view taken along line 5-5 in FIG. 4, of the fuel tank according to the second example embodiment of the invention.

Also, the fuel tank 52 of the second example embodiment has cylindrical attaching cylinders 56A and 56B that surround the deformation inhibiting members 18A and 18B, respectively. In FIG. 4, there is a space between the attaching cylinders 56A and 56B and the outer periphery of the deformation inhibiting members 18A and 18B, but in reality this gap does not exist (or is small). Fuel inflow-outflow holes, not shown, are formed in a lower portion of the attaching cylinders 56A and 56B, and fuel flows into and out of the attaching cylinders 56A and 56B.

Also, lateral separators 58 in the second example embodiment extend in an integrated manner from the attaching cylinders 56A at positions corresponding to the separator main body portions 28 of the first example embodiment. Furthermore, flexible plate portions 60 extend from the lateral separators 58 to the center attaching cylinder 56B, in positions corresponding to the flexible protruding portions 40 in the first example embodiment. The flexible plate portions 60 deform as indicated by the alternate long and short dashed line or the broken line in FIG. 4, thus allowing the lateral separators 58 to flex similar to the flexible protruding portions 40 in the first example embodiment, so this flexible plate portions 60 are the flexible portion of the invention.

In the second example embodiment, the attaching cylinders 56, the lateral separators 58, and the flexible plate portions 60 are all integrated to form an integrated member 62. The flexible protruding portions 40 are essentially formed by a pair of the flexible plate portions 60 and a portion of the center attaching cylinder 56B (i.e., a portion between the pair of flexible plate portions 60).

Also, the center attaching cylinder 56B joins the flexible plate portions 60 together, and is one example of a joining member of the invention in the second example embodiment.

In the second example embodiment, the deformation inhibiting members 18A and 18B are housed in the attaching cylinders 56, so the insert grooves 32 and 42 of the first example embodiment do not need to be formed in the deformation inhibiting members 18A and 18B.

In the fuel tank 52 of the second example embodiment structured in this way as well, when the upper surface 14T and the lower surface 14B of the fuel tank main body 14 move close to one another, the upper end 18T of the deformation inhibiting member 18 will contact the upper surface 14T via the vertical separator 20, so excessive deformation of the fuel tank main body 14 is able to be inhibited, similar to the fuel tank 12 of the first example embodiment. Also, the vertical separator 20 and the lateral separators 26 impart flow resistance on the flow of fuel inside the fuel tank main body 14, and thus are able to suppress flow noise.

Further, in the fuel tank 52 of the second example embodiment, even if the dimensions of the attaching portions of the deformation inhibiting members 18 change, the concentration of stress at these attaching portions is able to be mitigated by the flexible plate portions 60 moving toward and away from the deformation inhibiting members 18 (see arrows L3).

In the second example embodiment, the deformation inhibiting members 18 are housed inside the attaching cylinders 56, as described above. Therefore, the deformation inhibiting members 18 can be attached to the lower surface 14B of the fuel tank main body 14 beforehand, and then the integrated member 62 can be mounted from above the deformation inhibiting members 18A and 18B such that the deformation inhibiting members 18A or 18B are housed inside the attaching cylinders 56.

Next, a fuel tank of a third example embodiment of the invention will be described with reference to the drawings. In the third example embodiment, elements and members and the like similar to those in the first example embodiment will be denoted by like reference characters, and detailed descriptions thereof will be omitted.

In a fuel tank 72 of the third example embodiment, a center deformation inhibiting member 18B is attached to the upper surface 14T of the fuel tank main body 14. A tip end (a lower end) of the deformation inhibiting member 18B opposes the lower surface 14B with a gap therebetween.

A through-hole 74 through which the deformation inhibiting member 18B passes is formed in the center of the vertical separator 20.

With the fuel tank 72 of the third example embodiment structured in this way, when the upper surface 14T and the lower surface 14B of the fuel tank main body 14 come close together, the upper ends of the deformation inhibiting members 18A contact the upper surface 14T, and the lower end of the deformation inhibiting member 18B contacts the lower surface 14B of the fuel tank main body 14. As a result, excessive deformation of the fuel tank main body 14 is able to be inhibited. Also, the vertical separator 20 and the lateral separators 26 impart flow resistance on the flow of fuel inside the fuel tank main body 14, and thus are able to suppress flow noise.

Furthermore, with the fuel tank 72 of the third example embodiment, even if the dimensions change at the attaching portions of the deformation inhibiting members 18A, the concentration of stress at this attaching portions is able to be mitigated by the flexing of the flexible protruding portions 40.

As is evident from the description above, the third example embodiment is an example in which at least one deformation inhibiting member 18 is attached to the upper surface 14T of the fuel tank main body 14. In the third example embodiment, an example is given in which only one deformation inhibiting member 18B is attached to the upper surface 14T, but a structure in which any of the deformation inhibiting members 18, from among the deformation inhibiting members 18, are attached to the upper surface 14T may be employed. The concentration of stress at the attaching portions of the deformation inhibiting members 18 is able to be mitigated at the surface to which a plurality of the deformation inhibiting members 18 are attached (which may be the upper surface 14T or the lower surface 14B).

From this viewpoint, a structure is also possible in which at least one deformation inhibiting member 18 is attached to the upper surface 14T of the fuel tank main body 14, in the structure of the fuel tank 52 of the second example embodiment.

In all of the example embodiments described above, a deformation inhibiting member and a flow resistance plate are provided in the fuel tank main body 14, so the deformation state when the fuel tank main body 14 deforms is able to be controlled. In particular, with a structure in which a plurality of deformation inhibiting members 18 are attached to the lower surface 14B of the fuel tank main body 14 (such a structure corresponding to any one of the first to the third example embodiments), when there is a change in the internal pressure of the fuel tank main body 14, deformation of the lower surface 14B is inhibited, and the upper surface 14T is made to deform more than the lower surface 14B, so the volume of the fuel tank main body 14 is able to be changed. Also, with a structure in which the fuel tank main body 14 is sealed except under specific conditions such as fueling (i.e., with a so-called "sealed tank"), deformation of the lower surface 14B is suppressed (deformation of the lower surface 14B is unable to be completely prevented however), and deformation of the upper surface 14T is promoted compared to the lower surface 14B. As a result, a change in the internal pressure of the fuel tank main body 14 is able to be suppressed while maintaining the function of the fuel tank 12.

In the description above, a structure in which five deformation inhibiting members 18 are provided is illustrated. If there are a plurality of the deformation inhibiting members 18, stress following deformation of the fuel tank main body 14 may occur at the portions where these deformation inhibiting members 18 are attached to the fuel tank main body 14. This concentration of stress is able to be mitigated by employing the structure of the invention.

In the description above, the flexible protruding portion 40 and the flexible plate portion 60 are given as examples of the flexible, portion of the invention, but the flexible portion is not limited to these. For example, in the first example embodiment, the flexible portion may also be a bellows portion formed in a longitudinally center position of the separator main body portion 28. However, simply forming a bellows portion on the separator main body portion 28 may make the structure complicated, but the flexible portion is able to be formed by the simple structure of forming the flexible protruding portion 40 or the flexible plate portion 60. Also, as the flexible portion, the flexible protruding portion 40 in the first example embodiment may also be configured to protrude to the outside of a polygonal shape (a square) formed by the deformation inhibiting member 18A, for example. However, when the flexible portion is made to protrude to the outside in this way, fuel will strike the flexible portion as well, so a striking sound may inadvertently be generated. With respect to this, if the flexible portion is formed to the inside of a polygonal shape (a square) formed by the deformation inhibiting member 18A, as in the example embodiments described above, a striking sound generated by fuel striking the flexible portion is able to be suppressed. Furthermore, a structure in which tip end portions of the plurality of flexible protruding portions 40 or flexible plate portions 60 are retained by the deformation inhibiting member 18B is able to be easily realized.

In the description above, the deformation inhibiting member 18B also serves as the joining member of the invention, but the joining member may also be provided separately from the deformation inhibiting member 18B. With a structure in which the deformation inhibiting member 18B also serves as the joining member, there is no need to newly provide a joining member, so an increase in the number of parts is able to be suppressed.

In the description above, a flow resistance plate (i.e., the lateral separators 26 and 58) is given as an example of the joining member of the invention, but the joining member is not limited to a flow resistance plate. For example, a rod-shaped member that is separate from the flow resistance plate may be used, and a plurality of the deformation inhibiting members 18 may be connected together by extending this rod-shaped member between them. With the structures in the example embodiments of the invention, the flow resistance plate also serves as the joining member, so there is no need to newly arrange a joining member. As a result, the number of parts is less.

In the description above, the deformation inhibiting member 18 is given as an example of the extending member of the invention, but the extending member is not limited to the deformation inhibiting member 18. For example, the extending member may be a member provided for a purpose other than to inhibit deformation (such as to store fuel or detect the fuel level), inside the fuel tank main body 14. The extending member does not need to be formed in a cylindrical shape. For example, a shape such as an angular tube shape, a circular cylindrical shape, a rectangular cylindrical shape, or a plate shape may also be employed. The extending member is not limited to a member that is attached to the lower surface 14B of the fuel tank main body 14 and extends toward the upper surface 14T, or a member that is attached to the upper surface 14T and extends toward the lower surface 14B. For example, the extending member may also be a member that extends from one side surface toward an opposing side surface.

Figure 8A:
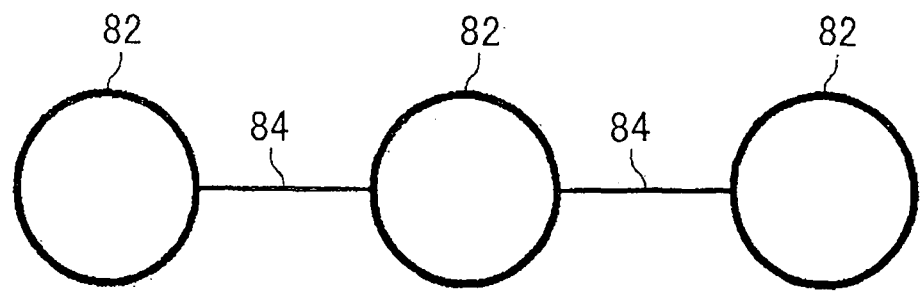
FIG. 8A is a plan view conceptually showing one arrangement of extending members and connecting members.
Figure 8B:
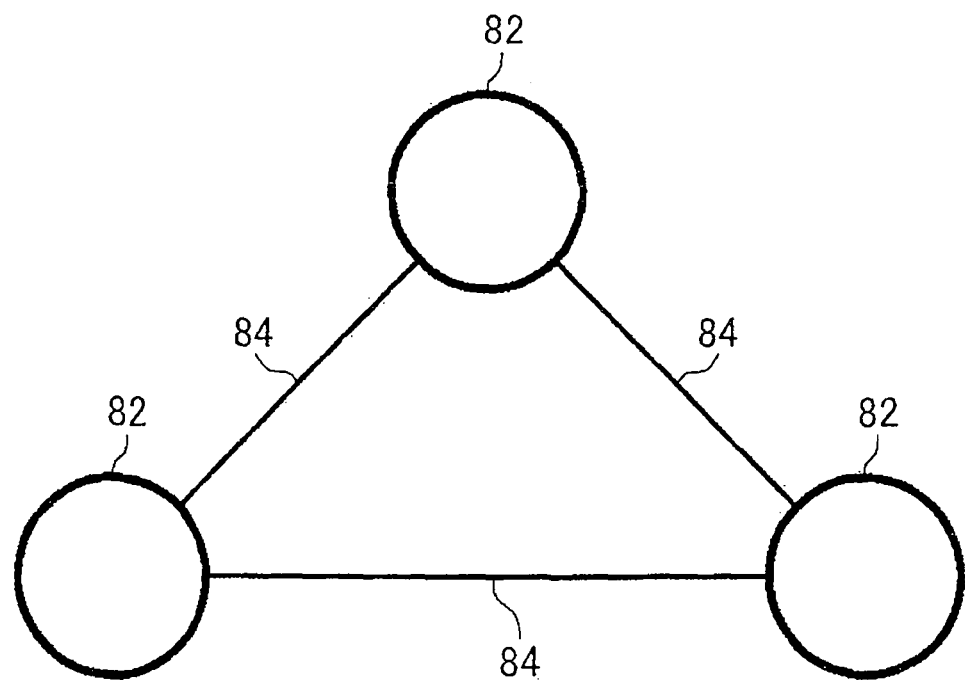
FIG. 8B is a plan view conceptually showing another arrangement of an extending members and connecting members.

With a structure in which three or more extending members are provided, extending members 82 may be arranged lined up in a straight line when viewed from above, as shown in FIG. 8A, or the extending members 82 may be arranged not lined up in a straight line when viewed from above, as shown in FIG. 8B. With a structure in which the extending members 82 are not lined up on the same straight line in this way, a member having an integrated frame shape when viewed from above (i.e., an integrated member) is formed by these extending members 82 being connected by connecting members 84, so the shape stability of this integrated member is increased.

Figure 8C:
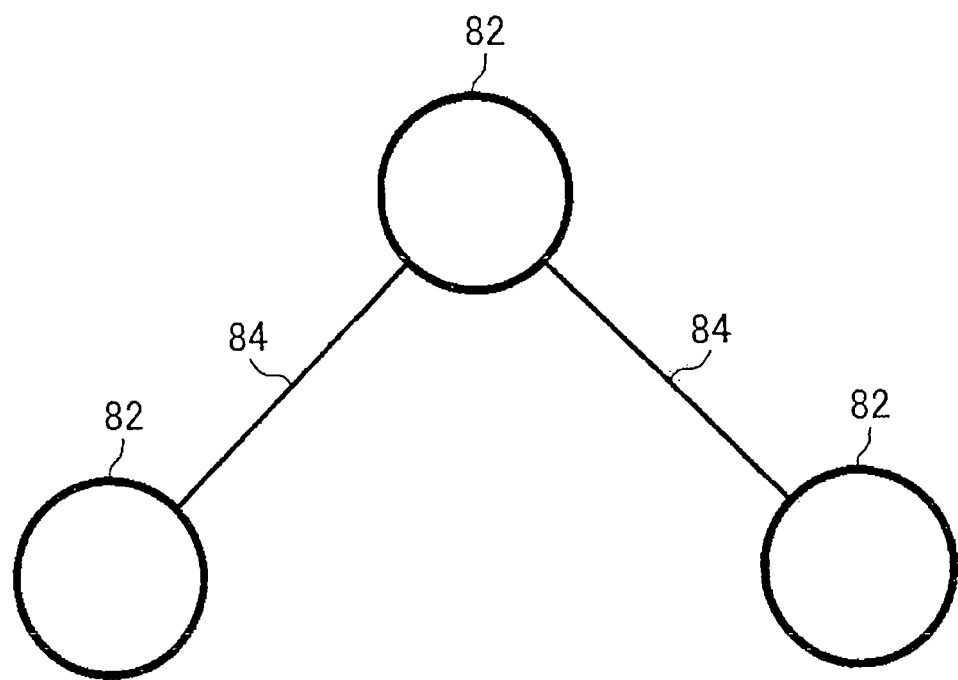
FIG. 8C is a plan view conceptually showing yet another arrangement of extending members and connecting members.

Also, in an arrangement in which the extending members 82 are not lined up in a single line when viewed from above, even if some of the connecting members 84 are omitted, as shown in FIG. 8C, an integrated structure in which all of the extending members 82 are connected together as a whole by the connecting members 84 is still possible. However, the structure shown in FIG. 8B has greater shape stability as an integrated member than the structure shown in FIG. 8C does.

With both the structure shown in FIG. 8B and the structure shown in FIG. 8C, the plurality of extending members 82 and the connecting members 84 are integrated, so compared with a structure in which these are separate, they are able to be easily attached to the fuel tank main body 14 as an integrated member.

FIGS. 8A to 8C are views to clearly show arrangements of the extending members 82 and the connecting members 84. The flexible portions are not shown.

The invention claimed is:
1. A fuel tank comprising:
a fuel tank main body within which fuel is stored;
a plurality of extending members attached to an inside surface so as to extend toward an opposing surface that opposes the inside surface of the fuel tank main body;
connecting members that connect each of the plurality of extending members together; and
flexible portions formed on the connecting members and allowing the connecting member to flex, each of the flexible portions joined directly to one of the plurality of extending members,
wherein the extending members are deformation inhibiting members that oppose the opposing surface in a non-contact state when a tank internal pressure of the fuel tank main body is at atmospheric pressure, and inhibit deformation of the fuel tank main body resulting from the inside surface coming close to the opposing surface.

2. The fuel tank according to claim 1, wherein three or more of the extending members are provided so as to be not collinear when viewed from a normal direction of the inside surface, and the extending members are connected by the connecting members to form an integrated member.

3. The fuel tank according to claim 2, wherein at least one of the flexible portions is a flexible protruding portion that protrudes in a direction toward a center of the integrated member when viewed from the normal direction of the inside surface.

4. The fuel tank according to claim 3, wherein the integrated member is a polygonal shape of which the three or more of the extending members are vertices when viewed from the normal direction of the inside surface.

5. The fuel tank according to claim 4, wherein the one of the plurality of extending members is a joining member that joins together a plurality of the flexible protruding portions that protrude toward the center of the integrated member.

6. The fuel tank according to claim 1, wherein at least one of the connecting members is a flow resistance plate that imparts resistance on a flow of fuel inside the fuel tank main body.

7. The fuel tank according to claim 1, wherein the one of the plurality of extending members is a joining member that includes a plurality of grooves into which the flexible portions are inserted.

* * * * *